United States Patent

[11] 3,625,742

[72] Inventor Philip Nixon Baldwin, Jr.
  Villa Park, Ill.
[21] Appl. No. 731,307
[22] Filed May 22, 1968
[45] Patented Dec. 7, 1971
[73] Assignee The Goodyear Tire & Rubber Company
  Akron, Ohio

[54] DIMETHYL FORMAMIDE SOLUBLE POLYURETHANE BONDED TO METAL USING AN EPOXY-POLYAMIDE PRIMER
1 Claim, No Drawings

[52] U.S. Cl. .................................................. 117/75,
  117/49, 117/132 B, 260/32.8, 260/75 TN,
  260/77.5 AP
[51] Int. Cl. .................................................. B32b 15/08
[50] Field of Search ........................................... 117/75, 132
  BE, 132 A, 161 KP; 161/186, 190, 214, 227

[56] References Cited
UNITED STATES PATENTS

| | | | |
|---|---|---|---|
| 3,483,015 | 12/1969 | Fukushima et al. | 117/161 KP |
| 2,811,497 | 10/1957 | Ham | 117/161 KP |
| 3,042,545 | 7/1962 | Kienle et al. | 117/75 |
| 3,164,488 | 1/1965 | Workman | 117/75 |
| 3,352,955 | 11/1967 | Pigott et al. | 117/161 KP |
| 3,443,983 | 5/1969 | Golding et al. | 117/75 |
| 3,447,949 | 6/1969 | Singer | 117/75 |

Primary Examiner—William D. Martin
Assistant Examiner—Ralph Husack
Attorneys—F. W. Brunner and J. D. Wolfe ABSTRACT: Polyurethane soluble in dimethylformamide, dimethylsulfoxide, or mixtures of these solvents is bonded to metal by means of an adhesive consisting of an epoxy resin and a polyamide.

DIMETHYL FORMAMIDE SOLUBLE POLYURETHANE BONDED TO METAL USING AN EPOXY-POLYAMIDE PRIMER

This invention relates to a method of preparing an adhesive, to said adhesive and to the use of the adhesive to prepare a metal polyurethane laminate.

It is desirable to protect the outer surface of jet aircraft by applying a coating to the metal surface thereof, particularly to protect the surface from erosion due to water and other airborne material while the plane is flying at high speeds. Consequently, numerous coating have been applied to airplanes to protect them but in actual use these coating have failed because the coatings tend to abrade or peel away from the metal surface.

The principal object of this invention is to provide a method of preparing an adhesive and a further object of this invention is to provide a laminate wherein metals are adhered to polyurethanes with said adhesive.

A laminate may be prepared by preparing the surface of the metal and then applying a coating of an adhesive prepared by mixing an epoxy resin with a polyamide in about 5 to 150 parts of said resin per 100 parts of the polyamide and then applying a dimethyl formamide soluble polyurethane over the adhesive coat to give a coating of about 5 to 50 mils and then allowing the solvent to evaporate to give the finished laminate of the metal a coating of polyurethane adhered thereto.

The polyamides useful in this invention are the reaction products of a polycarboxylic acid or its anhydride with a glycol such as ethylene or propylene having interspersed therein a significant amount of an amine to form a polyamide or the polyamide may be formed by reacting an organic polycarboxylic acid or its anhydride with an organic diamine. Suitable polycarboxylic acids are the aromatic, aliphatic and alicyclic acids having from about 2 to 10 or more carbon atoms. Representative members of the polycarboxylic acids or their anhydrides are adipic, succinic, glutaric, azelaic, suberic, phthalic, terephthalic, isophthalic, cyclohexane dicarboxylic acid and their halogenated derivatives.

The organic diamines can be aromatic, aliphatic and alicyclic in nature with the preferred members having from 2 to about 12 carbon atoms. Representative diamines are hexylene diamine, decamethylene diamine, methylene dianiline, phenylene diamine and diamino cyclohexane.

Also, amino alcohols, such as ethanol amine and amino carboxylic acids such as amino acetic acid can be used to form the polyamide.

The epoxy resin compounds employed in the process of this invention are well known. The general characteristic of this class of material is the presence of epoxy groups, which are of the formula

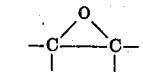

Ordinarily, epoxy resins contain a plurality of terminal epoxy groups. Usually epoxy resins are of moderately high molecular weight, containing more than 10, and usually more than 20 carbon atoms per molecule, although in this invention epoxy compounds containing fewer carbons may be used.

Epoxy resins are typically prepared by reaction of a polyfunctional epoxy compound with a compound containing two or more hydroxy radicals, producing epoxy resins comprising one or more ether linkages, joining organic radicals and terminating in epoxy groups.

The members of a preferred class of epoxy resins, for use in the process of this invention are the products of reactions of polyfunctional epoxy compounds with aromatic polyhydric phenolic compounds. The polyfunctional epoxy compound used in this connection may be a diepoxide, distinguished from the class of epoxy resins by its relatively low molecular weight, illustrative of which are diepoxybutadiene, and bis(2,3-epoxy-2-methylpropyl) ether. More usually, the polyfunctional epoxy compound is a haloepoxy compound, most commonly, epichlorhydrin. Reaction of epichlorhydrin, for example, with an aromatic polyhydric phenolic compound results in the formation of a polymer containing ether linkages between arylene radicals derived from the initial aromatic polyhydric compound and hydroxy-alkylene radicals derived from the initial haloepoxy compound, the polymers terminating in epoxy-alkyl radicals. The aromatic polyhydric compound may comprise a monocyclic phenol such as a resorcinol, a polycyclic phenol such as p,p'-(dihydroxy)-bisphenol, or phenolic resin such as a phenol-formaldehyde resin. In particular, there are preferred in the process of this invention, epoxy resins derived from the reaction of epichlorohydrin and bisphenols. These bisphenol derived resins correspond to the general formula:

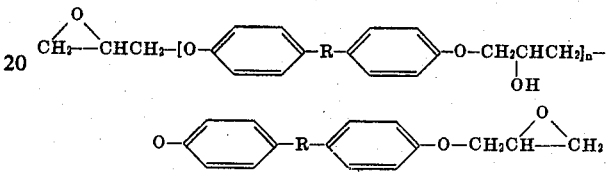

where $n$ is an integer, including zero and where R is a linking radical selected from -O- and

$y$ being selected from H and $C_xH_{2x+1}$ and $x$ is an integer of from 1 to about 16. Of course, the phenylene radical may or may not be substituted with a noninterfering substituent, such as a halogen atom or a lower alkyl radical containing from one to six carbon atoms. Illustrative of bisphenols which may be employed to produce resins of the above formula, giving rise to the arylene radical represented by the group

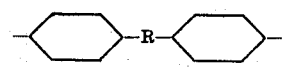

are, for example, p,p'-oxybisphenol, p,p'-methylene bisphenol, 2,2-bis(4-hydroxyphenol) propane, 2,2-bis(4-hydroxy-2-methylphenyl) propane, 2,2-bis (2-t-butyl-4-hydroxyphenyl) propane, 2,2-bis (2,5-dimethyl-4-hydroxyphenyl) propane, 2,2-bis(2-chloro-4-hydroxyphenyl) propane, 2,2-bis(2-bromo-6-fluoro-4-hydroxyphenyl) propane, 1,1-bis(4-hydroxyphenyl)ethane, 1,1-bis(4-hydroxyphenyl) isobutane, 1,1-bis(2-isopropyl-4-hydroxyphenyl) isobutane, 2,2-bis(4-hydroxyphenyl ) butane, 4,4-bis(4-hydroxyphenyl) heptane, 1,1-bis (4-hydroxyphenyl) dodecane, and 2,2-bis(4-hydroxyphenyl) hexadecane. Resins prepared from epichlorohydrin and 2,2-bis(4-hydroxyphenyl)-propane, are represented by the general formula.

Another class of epoxy resins commercially available and useful in the present process comprises aliphatic epoxy resins. Compounds of this nature may, for example, be prepared by a process analogous to that employed in preparing an epoxy resin from bisphenol, with the substitution of an aliphatic polyol for the aromatic hydroxy compound. As illustrative of epoxy resins of this class may be mentioned reaction products of an epoxy group source such as epichlorohydrin with aliphatic polyols such as triethylene glycol, 1,4-butylen glycol, hexamethylene glycol, octaethylene glycol, glycerol, and sorbitol.

A specific class of epoxy resins useful in this invention are the allyl glycidyl ether polymers of varying molecular weights.

Epoxy groups can be introduced into organic molecules by treatment of an aliphatic double bond with an appropriate oxidizing agent. Examples of epoxy compounds of this nature are the epoxidized polydienes such as epoxidized polybutadiene, epoxidized polyisoprene, epoxidized polypiperylene. epoxidized fats and oils such as soybean oil, etc. The above epoxidized compounds can and frequently do contain more than two epoxy groups per molecule. For example, the number of epoxy groups can vary from a single epoxy group to 2 to 5 or even up to 10 or more per molecule.

In general, aliphatic chains produce more flexible resins than aromatic, and mixed aliphatic and aromatic chains may alternatively be introduced into an epoxy resin, using the aforedescribed procedures, producing resins of modified properties.

As mentioned above, epoxidized cycloaliphatic compounds such as a diepoxide of diethylene glycol bisdihydrodicyclopentadienyl ether, are also comprised within the class of epoxy resins. Other feasible variations in epoxy resin structure will be known to the art. This invention contemplates the use of any of the variety of epoxy resins conventionally used in the industry for the production of resinous materials by curing processes.

It will be understood that in commercial epoxy resins, the integer $n$, representing in the above formulas the number of times the repeated unit of the polymer chain recurs, will vary from molecule to molecule. In general, any commercial resin will represent a mixture of resins of varying chain lengths corresponding to a varying number of repeated units. Compared to other widely used resin products, the epoxy resins are of relatively low molecular weight, and at least in part of the molecules, n may even be zero. Such resins are nevertheless designated as polymeric, however, with reference to the duplication of chain units in the molecule, and to the at least partial content of polymeric molecules usually present. Furthermore, though ideally the resin molecule, as represented by the above-illustrated formulas contains two epoxy groups per molecule, in practice it is found that the resinous products have a varying average number of epoxy groups per molecule. The epoxy group content of such resins is conventionally expressed as the epoxide equivalent, which refers to the grams of resin containing a gram equivalent of epoxide. The epoxide equivalent of a commercial resin is generally expressed as a range, such as 125–175, 150–200, etc. In the practice of this invention, epoxy resins having low epoxide equivalents, below 250, are preferred because of the lower viscosity of such resins, although higher equivalents offer advantages where viscosity is not a factor.

In accordance with one embodiment of this invention, the epoxy resin employed consists of a mixture of a polymeric epoxy resin and a monomeric epoxy compound. By a polymeric epoxy resin is here meant, as pointed out above, epoxy resins as described above, including resins of the above formulas where $n$ is zero. By a monomeric epoxy compound is here meant epoxy compounds of low molecular weight and characteristically containing a single epoxy group. As used in the present specification, the term epoxy resin refers either to a polymeric epoxy resin alone, or to a mixture of such polymeric epoxy resin with a monomeric epoxy compound. The use of an admixture of such a monomeric epoxy compound has the advantage that the viscosity of the epoxy resin is reduced. It is thus possible to use higher molecular weight and more viscous polymeric epoxy resins in the process of the invention while maintaining a workable viscosity in the mixture in most cases. Although monomeric epoxy compounds may be used in the process, if desired, the low viscosity polymeric epoxy compounds are generally preferred. Illustrative of epoxy compounds which may be employed in this connection are aliphatic epoxy ethers such as allyl glycidyl ether corresponding to the formula

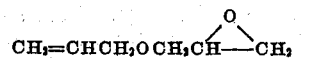

aromatic epoxy compounds such as phenyl glycidyl ether, glycidyl benzene and styrene oxide (1,2-epoxyethylbenzene) and hydroxyalkyl glycidyl ethers such as 2-hydroxyethylglycidyl ether.

The epoxy compounds may be monomeric or polymeric in nature as shown by the following list of representative epoxy materials:

TABLE 1

| Code | Epoxide | Supplier | Trade Name |
|---|---|---|---|
| | Monofunctional materials | | |
| A | Phenyl glycidyl ether. | | |
| B | Octylene oxide. | | |
| C | $C^{15}$–$C^{18}$ olefin oxide. | | |
| D | Styrene oxide. | | |
| E | Allyl glycidyl ether. | | |
| F | Propylene oxide | | |
| | Polyfunctional materials | | |
| G | Polyallylglycidyl ether | Shell Chem | |
| H | Vinylcyclohexene dioxide | Union Carbide | Unox Epoxide 206. |
| I | Dicyclopentadiene dioxide | do | Unox Epoxide 207. |
| J | 3,4-epoxy-6-methylcyclohexylmethyl-3,4-epoxy-6-methylcyclohexane-carboxylate. | do | Unox Epoxide 201. |
| K | Dipentene dioxide | FMC* | |
| L | Epichlorohydrin-glycerine reaction product. | Shell Chem | Epon 812. |
| M | Epichlorohydrin-1,4-butanediol reaction product. | Ciba Chem | Araldite RD-2. |
| N | Epichlorohydrin-bisphenol-A reaction product. | Dow Chem | DER-332. |
| O | Similar to N except higher molecular weight | Shell Chem | Epon 828. |
| P | Similar to N except higher molecular weight. | do | Epon 1001 |
| Q | Epoxidized soya bean oil | Swift & Co | Epoxol 7-4. |
| R | Epoxidized polydiene | FMC* | Oxtron 2000. |
| S | 1,3-bis [3(2,3-epoxy propoxy) propyl] tetramethyl disiloxane. | Dow Corning | Syl Kem 90. |
| T | Bis-epoxydicyclopentyl ether of ethylene glycol. | Rohm & Haas | AG-13E. |
| U | Epoxylated novalacs (phenolformaldehyde product). | Dow | DEN 438. |

*FMC—Food Machinery and Chemical Corporation.

The polyureaurethanes useful in this invention are prepared by the reaction of the following ingredients: the linear polyesters prepared from dihydric alcohols and dicarboxylic acids and having molecular weights ranging from about 1,700 to about 2,100, water in the amount of from about 2.5 to 4.0 mols per mol of polyester and diisocyanate selected from the group consisting of 2,4-tolylene diisocyanate and mixtures of 2,4 and 2,6 tolylene diisocyanate, the 2,6 isomer being present to an extent of not more than about 10 percent of the total diisocyanate in the mixture, the total diisocyanate being present in an amount of at least 80 mol percent of the equivalent amount (the amount theoretically required to react with the "reactive groups" present in the polyester and the water, said reaction being carried out in the presence of the catalyst system comprising a mixture of ($a$) N-methylmorpholine and ($b$) a condensation product of 1 mol of aniline and 4 mols of n-butyraldehyde, each in an amount ranging from about 0.25 to 3.0 parts by weight per 100 parts of polyester, the total catalyst employed ranging from about 0.5 to not more than 3.25 parts by weight per 100 parts of polyester employed.

More particularly, the liquid reaction mixture of polyester, water, diisocyanate and catalyst is allowed to foam and the foam is destroyed while it is in a fluid, unstable state thereby converting the liquid reaction mixture to a pulverulent, solid, noncellular elastomer. This is accomplished by means of a shearing action exerted upon the foaming liquid reaction mixture facilitating the release of carbon dioxide by destroying the cellular structure. The resulting elastomer is then heated at a time and temperature ranging from 1 hour at 100° C. to about 8 hours at 125° C. to effect the cure.

The term "reactive group" as employed in this application is meant to include both hydroxyl and carboxyl groups present in the substance described (usually the polyester and water).

While it is possible to employ mixtures of 2,4 and 2,6-tolylene diisocyanates wherein the 2,6 isomer may approach approximately 20 percent by weight of the total diisocyanate, it is preferred that no more than 10 percent of the 2,6 isomer be employed. The 2,6 isomer when it is employed in this invention at more than 10 percent by weight of the total tolylene diisocyanate tends to cause the resulting polyureaurethane to be only partially soluble. These partially soluble polyureaurethanes, while they are still useful in certain instances for my purpose, may be subjected to the extra step of filtration when employed as a solution.

The polyesters useful in the formation of the dimethyl formamide soluble polyurethanes of this invention are prepared by the condensation reaction between one or more glycols and one or more dibasic carboxylic acids. Normally the ratio of glycol to dibasic acid should be controlled so that there is an excess of glycol employed. This is done in order to obtain linear polyester chains containing a preponderance of terminal hydroxyl groups. Any glycol can be used in the preparation of these polyesters. Representative examples are ethylene glycol; propylene glycol; 2,3-, 1,3-, and 1,4-butylene glycols; 2-methyl pentanediol-2,4; 2-ethyl hexanediol; 1,3-hexamethylene glycol; diethylene glycol; triethylene glycol and the polypropylene glycols. Any dibasic carboxylic acid can be used in the preparation of these polyesters. Representative examples are adipic, sebacic, malonic, suberic, succinic, maleic, fumaric and itaconic acids. The preferred polyesters are those prepared by reacting adipic acid with ethylene glycol, propylene glycol, diethylene glycol and/or the butylene glycols, the glycols being used singly or in mixtures of two or more, to give polyesters having a molecular weight ranging from about 1,700 to about 2,100. These polyesters should have hydroxyl numbers of from about 70 to 52 and acid numbers of less than 2, thereby exhibiting a preponderance of terminal hydroxyl groups.

The water used in the practice of this invention is considered to be a bifunctional cross-linking agent by virtue of the intermediate amines which are formed. The amount of water employed must range from 2.5 mols to 4.0 mols per mol of polyester used. If a lower amount of water is used, the finished product will be a soft, somewhat gummy, insufficiently cured elastomer and will not exhibit satisfactory physical properties. If more than 4.0 mols of water are used the elastomer formed will be a hard, highly cross-linked, less soluble product and again will not exhibit the optimum physical properties. Best results have been obtained when approximately 3.0 mols of water per mol of polyester are employed in the practice of this invention.

The tolylene diisocyanates useful in the practice of this invention are 2,4-tolylene diisocyanate and mixtures of 2,6-tolylene diisocyanate and 2,4-tolylene diisocyanate wherein the 2,6-isomer is limited to not more than 10 percent by weight of the mixture. If more than 10 percent by weight of the 2,6-isomer is used the resulting elastomer will tend to become insoluble and therefore tend to become an undesirable product. The preferred tolylene diisocyanate is 2,4-tolylene diisocyanate alone or in mixture with not more than 5 percent by weight of the 2,6-isomer.

The amount of tolylene diisocyanate employed in this invention is at least 80 mol percent of the amount theoretically required to react with all of the hydroxyl and carboxyl groups (reactive groups) present in the polyester and the water. While more than the theoretical amount may be employed, any amount in excess of the theoretical amount of isocyanate groups required to react with the "reactive groups" of the polyester and the water produces no further substantial improvement in the finished product to warrant the added cost of this excess amount of diisocyanate. Therefore, in practice, it is preferred to use from 80 to 100 mol percent of the theoretical amount. Any amount of diisocyanate which contains more than a 20 percent deficiency of isocyanate groups theoretically required to effect complete reaction with the "reactive groups," i.e., the hydroxyl and carboxyl groups, of the polyester and the water will produce a finished product which is too soft and gummy to exhibit satisfactory physical properties. The most preferred amount of tolylene diisocyanate in the practice of this invention is about 10 percent less than the number of isocyanate groups theoretically required to react with the hydroxyl and carboxyl groups ('reactive groups") of the polyester and the water or about 90 mol percent of the theoretical amount.

The catalyst normally employed in the practice of this invention consists of a mixture of N-methyl morpholine and the condensation product of 1 mol of aniline and 4 mols of n-butyraldehyde. It is preferred to employ at least about 0.25 to about 3.0 parts by weight of each to obtain satisfactory products. However, due to the exothermic nature of the reaction it is also preferred to employ these two catalysts in amounts where they are in an amount totaling 3.25 parts by weight per 100 parts of polyester. Thus, it is suggested that one catalyst be employed in ranges from 0.25 to 3.0 while the other be employed in ranges from 3.0 to 0.25 parts by weight per 100 parts of polyester. The condensation product of one mol of aniline and four mols of n-butyraldehyde is further described in U.S. Pats. Nos. 1,780,326 and 1,780,334. Best results have been obtained with these catalysts in amounts of 0.7 part by weight of the condensation product of aniline and n-butyraldehyde and 0.5 part by weight of N-methyl morpholine per 100 parts by weight of the polyester used.

Small amounts of material having more than two functional groups per molecule, such as castor oil or other tribasic compounds may be incorporated into the polyester used in the practice of this invention without adversely affecting the solubility, yet enhancing physical properties, particularly the tensile strength. Thus, it has been found that up to about 3 parts by weight of castor oil or other trihydric compounds may be added per 100 parts by weight of polyester used. This absence of effect upon the solubility of the cured elastomers when polyfunctional material is added is not fully understood, since one would be led to believe that a material having a functionality greater than two would tend to cause a greater amount of cross-links to form and it would be likely that such a polymer would be insoluble.

In the preparation of the cured soluble polymeric elastomers used in this invention, it is desirable to make use of a sigma-blade type of internal mixer. One such mixer that has been found very effective is a Baker-Perkins mixer which has two counter rotating sigma-type blades that exert a high shearing action upon the material. The following procedure is recommended. The polyester is added to the mixer first; the required amount of tolylene diisocyanate is added to the polyester, one of the catalysts is added and mixed in and then the water followed by the second catalyst is added to this mixture, at which time the mixture begins to foam. This foam is destroyed by the shearing action of the sigma-type blades. The mixing is continued until a solid semicured elastomer has been formed, which has been reduced by the action of the rotating blades to a very small lumps or even powder. These discrete particles or crumbs are easily removed from the mixer and are heated in an oven for approximately 1 hour at 100° C. to about 8 hours at 125° C. to complete the cure.

Solvents which have been found to be particularly useful for forming solutions of these cured polyureaurethane elastomers are dimethylformamide, dimethylsulfoxide, or mixtures of these solvents. The preferred mixture of dimethyl sulfoxide with dimethylformamide or dimethylacetamide are those having a freezing point of at least about −30° C. Whenever any of the first three mentioned solvents are used, a dissolution agent must also be used in the amount of from 0.1 to 1 percent by weight, based on the solvent. The most effective dissolution agent useful for this purpose is di-n-butylamine. However, it has been found that, when dimethyl sulfoxide is used as a solvent, it possesses a solvent power so great that no dissolution agent is necessary. It has also been found that if the products of this invention are dissolved in aforementioned solvents and cast into structures no further dissolution agent is required to be present in the solvent to redissolve this once cast product.

In general, solutions up to 50 percent by weight solids content of elastomer in solvent can be prepared and used, although the solutions are more viscous as the solids content increases.

Further details of the practice of this invention are set forth in the following examples which are to be interpreted as representative rather than restrictive of the scope of this invention.

EXAMPLE A

Into a suitable container was placed 900 grams of a polyester prepared from the condensation of approximately 1.1 mols of a mixed glycol of ethylene glycol, and butanediol-1,4 in equal molar quantities with approximately 1.0 mol of adipic acid. This polyester had an hydroxyl number of approximately 60 and an acid number of approximately 1 (resulting in a "reactive number" of 61) and a molecular weight of approximately 1,800. To this polyester were added 92.7 grams of a mixture of 98 parts by weight of 2,4-tolylene diisocyanate and 2 parts by weight of 2,6-tolylene diisocyanate. This mixture was stirred for 36 minutes while being maintained at a temperature ranging from 60° to 63° C. (This partially diisocyanate-modified polyester is called a prepolymer). To this prepolymer were added 222 grams of a mixture of 98 parts by weight of 2,4-tolylene diisocyanate and 2 parts by weight of 2,6-tolylene diisocyanate, and 13.5 grams of castor oil. The mixture was then transferred to a 2-quart Baker-Perkins Sigma-blade mixer and 6.3 grams of catalyst (the condensation product of 1 mol of aniline and 4 mols of n-butyraldehyde) were added. After mixing for 4 minutes, 27.3 grams of water were added at which time the mixture began to foam, this foam was destroyed by the shearing action of the Sigma-blades. Some 3 minutes after the addition of the water, 5 cubic centimeters of N-methylmorpholine (another catalyst) were added. After this mixture had been allowed to mix for a period of approximately 20 minutes in the Baker-Perkins mixer, the formation of elastomer was observed. The mixing was continued for an additional 30-minute period, during which time the elastomer was reduced to powdered form. This was done to allow ease of handling and removal of the elastomer from the mixer. This powdered elastomer was heated in a 100° C. oven for 60 minutes to complete the cure.

EXAMPLE B

The procedure described in example A was duplicated except that no castor oil was added to the polyester.

EXAMPLE C

A mixture consisting of (A) 750 grams of a polyester resulting from the condensation of adipic acid with a mixture containing equimolar quantities of ethylene glycol, diethylene glycol and butanediol-1,4 and having a hydroxyl number of approximately 60, an acid number of approximately 1 and a molecular weight of approximately 1,800, and (B) 259 grams of tolylene diisocyanate (98 percent of the 2,4-isomer and 2 percent of the 2,6-isomer) was placed in a Baker-Perkins mixer. To this mixture were added 11.2 grams of castor oil. After stirring for approximately 1 minute, 5.3 grams of catalyst (the condensation product of one mol of aniline and four mols of n-butyraldehyde) were added to the mixture. Three minutes later 22.7 grams of water were added, at which time the mixture foamed. The foam was destroyed by the shearing action of the Sigma-blades. After a short interval (approximately three minutes), 4.1 cubic centimeters of N-methylmorpholine were added. The foaming continued but was constantly suppressed by the action of the Sigma-blades. The maximum exothermic temperature reached during this reaction was 90° C. Twenty-four minutes after the reaction started the elastomer began to form, the mixing being continued to reduce the elastomer to a powder form. This powdered elastomer was placed in a 100° C. oven for 1 hour to complete the cure.

EXAMPLE D

The procedure described in example A was repeated except that the polyester was a condensation product of approximately 1.1 mols of a 60/20 molar ratio of ethylene glycol/propylene glycol with approximately 1.0 mol of adipic acid. This polyester had an hydroxyl number of approximately 58 and an acid number of less than 1 and a molecular weight of approximately 1,900.

While the following three examples are not illustrative of the preferred practice of this invention, they are included to illustrate that the resulting elastomers are only partially soluble in dimethylformamide if the 2,6-isomer content of the mixed tolylene diisocyanate used in the preparation of these elastomers is more than 10 percent by weight of the total mixture of diisocyanate and completely insoluble if more than 20 percent of the 2,6-isomer is employed.

EXAMPLE E

The same procedure was used as in example A, except that the tolylene diisocyanate was a mixture of 80 percent of the 2,4-isomer and 20 percent of the 2,6-isomer, by weight.

EXAMPLE F

The same procedure was used as in example E except that, instead of 13.5 grams, only 6.8 grams of castor oil were added to the polyester.

EXAMPLE G

The same procedure was used as in example A except that the tolylene diisocyanate used was a mixture of 48 percent of the 2,4-isomer and 52 percent of the 2,6-isomer, by weight.

The following two experiments illustrate representative methods for using dimethyl formamide soluble polyurethanes of any type to protect a metal surface by use of a tie coat of epoxy resin and an organic polyamide.

EXAMPLE 1

An adhesive was prepared by mixing 60 parts of a polyamide prepared by condensing hexylene diamine with adipic acid with 40 parts of a high molecular weight reaction product of epichlorhydrin and bisphenol A dissolved in 140 parts of methyl ethyl ketone. This adhesive was brushed on a nickel sheet such as is used in aircraft construction which had been sand blasted to clean away any coatings or contaminants thereon. This brush coat of adhesive was allowed to air dry until slightly tacky, then a dimethyl formamide solution of a polyurethane prepared according to example A was brushed over the adhesive coat on the nickel and allowed to air dry.

EXAMPLE 2

Another adhesive was prepared by blending 30 parts of a high molecular weight reaction product of epichlorhydrin bisphenol A and 10 parts of a high molecular weight reaction product of epichlorhydrin and glycerine. This mixture of reaction products was dissolved in 150 parts of methyl ethyl ketone and then 60 parts of a polyamide having an equivalent weight of 70 prepared by condensation of hexylene diamine with adipic acid was mixed therewith. This adhesive system was stable at 80° C. for 8 to 9 days at which time it was applied to the following metal sheet: aluminum, zinc aluminum alloy and steel, which had been freshly cleaned by a methyl ethyl ketone wash and allowed to air dry until it was almost tackfree. Then a coating of the polyurethane of example A was applied to each of these metal sheets by brushing and allowed to cure at 170° F. for 30 minutes. These samples of the metal bearing the polyurethane coating then was subjected to a whirling arm erosion tester at a tangential velocity of 500 miles per hour in a two inch per hour simulated rain. There was no sign of erosion or failure of the polyurethane coating under these test conditions whereas materials such as neoprene and polybutadiene acrylonitrile coatings showed massive failures under similar test condition. Also, the wing surface of an airplane was coated with this adhesive and the polyurethane according to the procedure above and subjected to flight through rain storms. for 440 minutes at speeds of 345 miles per hour at an altitude of 15,000 to 20,000 feet without any indication of failure of the coating, whereas other coatings of neoprene or polybutadiene acrylonitrile failed.

Thus, the dimethylformamide soluble polyurethane elastomers can be adhered to metal by cleaning the metal either with a solvent wash or abrasion treatment, for instance, a shot blast, and then treating the clean metal with an adhesive comprising a mixture of an epoxy resin and a polyamide dispersed in sufficient solvent for the epoxy resin and polyamide to give a dispersion that is brushable, usually about 10 to about 70 percent solid basis.

While certain representative embodiments and details have been shown for the purpose of illustrating the invention, it will be apparent to those skilled in this art that various changes and modifications may be made therein without departing from the spirit or scope of the invention.

What is claimed is:

1. A coated metal consisting of a metal selected from the group consisting of nickel, aluminum, zinc aluminum alloy and steel and a coating of a dimethyl formamide soluble cured polyurethane, said metal and cured polyurethane being bonded together with an adhesive consisting of a mixture of 5 to 150 parts of an epoxy resin per 100 parts of a polyamide, said polyamide being the reaction product of an organic polycarboxylic acid or its anhydride having from 2 to about 10 carbon atoms and an organic diamine having from 2 to about 12 carbon atoms.

* * * * *